United States Patent
Oosawa

(10) Patent No.: US 7,245,747 B2
(45) Date of Patent: Jul. 17, 2007

(54) IMAGE PROCESSING METHOD AND APPARATUS AND PROGRAM FOR IMAGE PROCESSING

(75) Inventor: Akira Oosawa, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 573 days.

(21) Appl. No.: 10/124,331

(22) Filed: Apr. 18, 2002

(65) Prior Publication Data

US 2003/0063785 A1    Apr. 3, 2003

(30) Foreign Application Priority Data

Apr. 25, 2001 (JP) ............................. 2001-126856
Feb. 13, 2002 (JP) ............................. 2002-035524

(51) Int. Cl.
  *G06K 9/00* (2006.01)
  *G06K 9/46* (2006.01)
  *G06K 9/62* (2006.01)

(52) U.S. Cl. ................. 382/128; 382/190; 382/209; 382/224

(58) Field of Classification Search ............. 382/128, 382/132, 224
See application file for complete search history.

(56) References Cited

U.S. PATENT DOCUMENTS

| | | | |
|---|---|---|---|
| 4,951,201 A * | 8/1990 | Takeo et al. ................. | 382/128 |
| 5,270,530 A * | 12/1993 | Godlewski et al. ....... | 250/208.1 |
| 5,862,249 A * | 1/1999 | Jang et al. .................. | 382/132 |
| 5,943,435 A * | 8/1999 | Gaborski ..................... | 382/132 |
| 6,055,326 A * | 4/2000 | Chang et al. ............... | 382/132 |
| 6,381,348 B2 * | 4/2002 | Takeo .......................... | 382/128 |
| 6,548,823 B2 * | 4/2003 | Nagatsuka et al. ......... | 250/584 |
| 6,678,703 B2 * | 1/2004 | Rothschild et al. ......... | 707/201 |
| 6,836,558 B2 * | 12/2004 | Doi et al. .................... | 382/131 |
| 2002/0038381 A1 * | 3/2002 | Gendron et al. ............ | 709/238 |
| 2002/0085743 A1 * | 7/2002 | Kawano ..................... | 382/132 |

OTHER PUBLICATIONS

Matthew Turk et al, Eigenfaces for Recognition, Journal of Cognitive Neuroscience, 1991, pp. 72-86, vol. 3, No. 1, Massachusetts Institute of Technology.

* cited by examiner

*Primary Examiner*—Andrew W. Johns
*Assistant Examiner*—Anthony Mackowey
(74) *Attorney, Agent, or Firm*—Sughrue Mion, PLLC

(57) ABSTRACT

Whether medical image data is provided with photographing information representing the object part and/or the direction of taking the image is judged, and the object part and/or the direction of taking the image of the medical image data is recognized on the basis of the medical image data when the image data is not provided with photographing information. The medical image data is attached with the result of the recognition as the photographing information.

3 Claims, 7 Drawing Sheets

CURRENT          PAST ial image transfer. Since the DICOM standard supports TCP/IP protocol for the current internet, use of the DICOM standard permits apparatuses made by different makers to transfer therebetween information on patients and/or medical image data by way of a network, whereby problems inherent to the conventional diagnosis mainly based on the photographic films (e.g., on the storage of the photographic films or the delivery speed) can be overcome and additional values can be expected.

IMAGE PROCESSING METHOD AND APPARATUS AND PROGRAM FOR IMAGE PROCESSING

BACKGROUND OF THE INVENTION

1. Field of the Invention

This invention relates to an image processing method and an image processing apparatus for carrying out image processing such as gradation processing, frequency processing, temporal subtraction processing or metering processing on medical image data representing a medical image such as a radiation image or a magnetic resonance image on the basis of the object part thereof and/or the direction of taking the image. This invention also relates to a program for causing a computer to execute the image processing method.

2. Description of the Related Art

Recently, DICOM (Digital Imaging and Communication in Medicine) standard has come to be used as a standard for medical image transfer. Since the DICOM standard supports TCP/IP protocol for the current internet, use of the DICOM standard permits apparatuses made by different makers to transfer therebetween information on patients and/or medical image data by way of a network, whereby problems inherent to the conventional diagnosis mainly based on the photographic films (e.g., on the storage of the photographic films or the delivery speed) can be overcome and additional values can be expected.

The medical image data transferred in an open network environment using such DICOM standard is generally attached with photographing information representing the object part (e.g., head, chest or abdomen) thereof and/or the direction of taking the image (e.g., from the front, from a side or the like) as well as the file name, the size and the like of the medical image data as attendant information. Kinds of image processing and image processing parameters suitable for the object part and/or the direction of taking the image are selected on the basis of the photographing information attached to the medical image information. Then the medical image data is subjected to image processing such as gradation processing, frequency processing, dynamic range compression processing and the like. The photographing information sometimes used for selecting a plurality of radiation images, whose object parts and/or directions of taking the image are the same, to be compared with each other. The selected radiation images are sometimes displayed side by side to facilitate comparison of the radiation images and are sometimes subjected to an inter-image operation such as temporal subtraction processing where subtraction is carried out between corresponding pixels of the radiation images. Further, the photographing information sometimes used for selecting a radiation image to be subjected to metering processing for measuring the degree of scoliosis or the cardiothoracic ratio or to computer aided diagnosis of medical images in which prospective abnormal shadows are automatically detected by the use of computer processing.

However, in the open network environment using such DICOM standard, depending on the apparatus by which the medical image data is obtained, the medical image data is sometimes not attached with photographing information. It has been difficult to carry out an optimal image processing on such medical image data. Though the operator who carries out image processing can attach photographing information to the medical image data by viewing an image reproduced on the basis of the medical image data and recognizing the object part and/or the direction of taking the image, it is very troublesome.

SUMMARY OF THE INVENTION

In view of the foregoing observations and description, the primary object of the present invention is to provide an image processing method and apparatus which make it feasible to carry out on medical image data an optimal image processing on the basis of the object part and/or the direction of taking the image even if the medical image data is attached with no photographing information.

In accordance with a first aspect of the present invention, there is provided an image processing method comprising the steps of judging whether medical image data is provided with photographing information representing the object part thereof and/or the direction of taking the image, recognizing the object part and/or the direction of taking the image of the medical image data on the basis of the medical image data when it is judged that the image data is not provided with photographing information, and providing the medical image data with the result of the recognition as the photographing information.

In accordance with a second aspect of the present invention, there is provided an image processing method comprising the steps of judging whether medical image data is provided with photographing information representing the object part thereof and/or the direction of taking the image, recognizing the object part and/or the direction of taking the image of the medical image data on the basis of the medical image data when it is judged that the image data is not provided with photographing information, and subjecting the medical image data to image processing on the basis of the result of the recognition.

The term "image processing" as used here includes as well as gradation processing, frequency processing and dynamic range compression processing, to display a plurality of images side by side, to set layout of images when a plurality of images are to be displayed side by side, to perform inter-image operation such as temporal subtraction processing, to select image to be subjected to metering processing or to computer aided diagnosis of medical images and the like.

Further, the term "medical image" as used here includes a radiation image, a magnetic resonance image and an ultrasonogram obtained by radiography, magnetic resonance imaging and ultrasonography. Further, the object may be an animal such as horses or dogs as well as a human body.

In accordance with a third aspect of the present invention, there is provided an image processing apparatus comprising a judging means which judges whether medical image data is provided with photographing information representing the object part thereof and/or the direction of taking the image, a recognizing means which recognizes the object part and/or the direction of taking the image of the medical image data on the basis of the medical image data when the judging means judges that the image data is not provided with photographing information, and a photographing information providing means which provides the medical image data with the result of the recognition as the photographing information.

In accordance with a fourth aspect of the present invention, there is provided an image processing apparatus comprising a judging means which judges whether medical image data is provided with photographing information representing the object part thereof and/or the direction of taking the image, a recognizing means which recognizes the object part and/or the direction of taking the image of the medical image data on the basis of the medical image data when the judging means judges that the image data is not provided with photographing information, and a control means which subjects the medical image data to image processing on the basis of the result of the recognition.

In accordance with the present invention, since medical image data can be subjected to an optimal image processing even if it is not provided with photographing information since if the medical image data is not provided with photographing information, the medical image data without photographing information can be automatically provided with photographing information on the basis of the medical image data or is subjected to image processing on the basis of the photographing information recognized on the basis of the medical image data.

DESCRIPTION OF THE PREFERRED EMBODIMENTS

Embodiments of the present invention will be described with reference to the drawings, hereinbelow. An image processing apparatus in accordance with a first embodiment of the present invention will be first described with reference to FIGS. 1 and 2, hereinbelow. In the first embodiment, a plurality of radiation images including a plurality of chest radiation images taken from the front and a plurality of chest radiation images taken from a side are processed so that radiation images taken in the same direction are displayed side by side, though the present invention may be applied to other medical image data obtained by, for instance, magnetic resonance imaging or ultrasonography.

Figure 1:
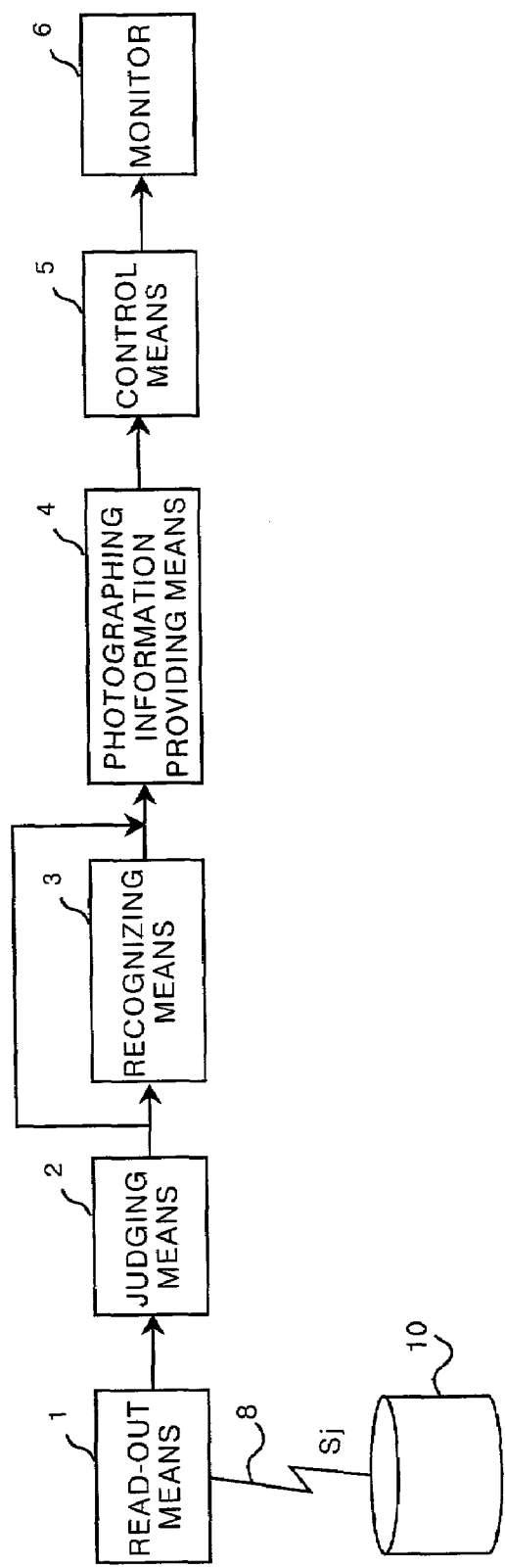
FIG. 1 is a schematic block diagram for illustrating the structure of an image processing apparatus in accordance with a first embodiment of the present invention.
Figure 2:
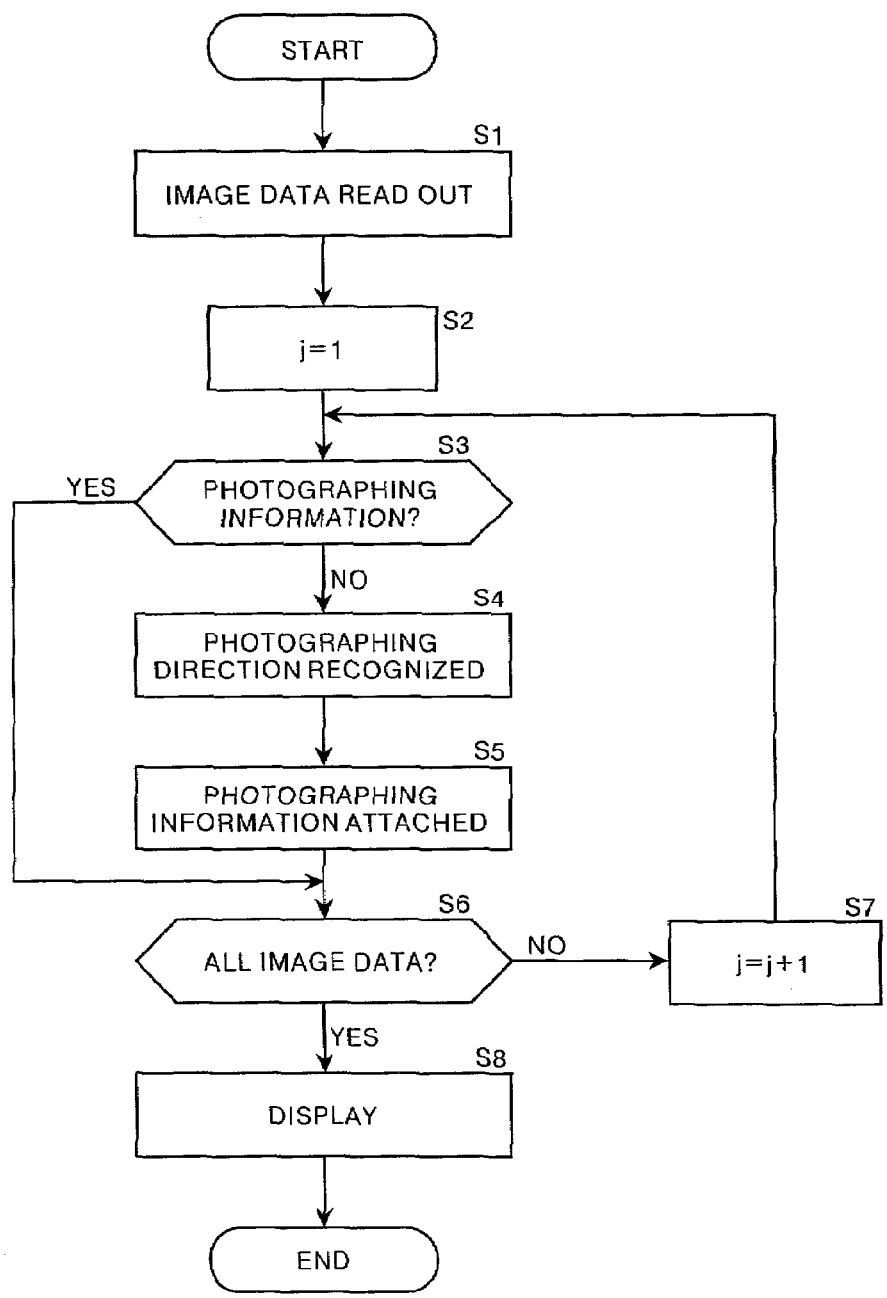
FIG. 2 is a flow chart for illustrating the operation of the image processing apparatus of the first embodiment.
Figure 3:
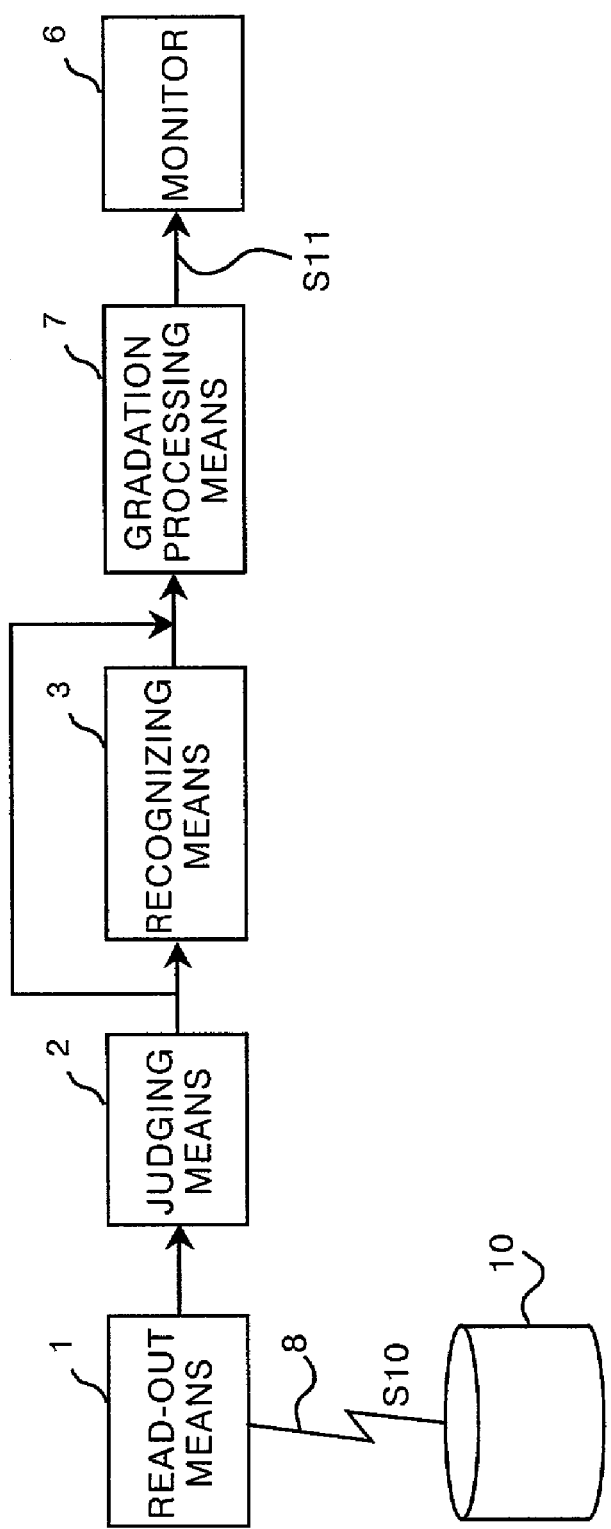
FIG. 3 is a schematic block diagram for illustrating the structure of an image processing apparatus in accordance with a second embodiment of the present invention.

As shown in FIG. 1, the image processing apparatus in accordance with the first embodiment of the present invention comprises a read-out means 1 which reads out a plurality of pieces of image data Sj (j=1 to n) each representing an image from an image data base 10 storing a plurality of pieces of image data by way of a network 8 and displays the images represented by the image data Sj on a monitor 6, a judging means 2 which judges whether each piece of the medical image data Sj read out is provided with photographing information representing the direction of taking the image, a recognizing means 3 which recognizes the direction of taking the image (will be referred to as "photographing direction", hereinbelow) represented by each piece of the medical image data on the basis of the medical image data when the judging means 2 judges that the image data is not provided with photographing information, a photographing information providing means 4 which provides the medical image data Sj with the result of the recognition by the judging means 3 as the photographing information and a control means 5 which controls the monitor 6 in displaying a plurality of images on the basis of the photographing information provided to the image data Sj.

The read-out means 1 is formed by various interfaces such as a LAN card, a modem and the like which can transmit and receive image data.

The judging means 2 judges whether each piece of the medical image data Sj read out is provided with photographing information by searching tag information of the image data Sj for the photographing information.

The recognizing means 3 recognizes the photographing direction by the use of a characteristic image which has been made in advance using a plurality of pieces of image data. There has been proposed in a paper (Matthew Turk, Alex Pentland "Eigenfaces for Recognition", Journal of Cognitive Neuroscience, vol. 3, No. 1, 1991) a method of recognizing a face by the use of a characteristic image. In this particular embodiment, the recognizing means 3 recognizes the photographing direction by the use of the method of recognition described in the paper. The method will be described in detail, hereinbelow.

M (in number) front chest radiation images (chest radiation images taken from the front) and M side chest radiation images (chest radiation images taken from a side which are N×N in pixel size are prepared as a template image for recognition, and a characteristic image for each direction is calculated by the following operation (for each direction) Since the characteristic image for side chest radiation images can be obtained by the same operation as that for obtaining the characteristic image for front chest radiation images, the operation for obtaining a characteristic image for front chest radiation images will be described only, hereinbelow.

The average value $\Psi$ of each pixel of the M front chest radiation images is first calculated according to the following formula (1) and then the deviation $\Phi i$ of each pixel of each of the M front chest radiation images from the average value $\Psi$ is calculated according to the following formula (2).

$$\Psi = (1/M) \sum_{i=1}^{M} \Gamma i \qquad (1)$$

wherein $\Gamma i$: front chest radiation image, i=1~M, and
$\Phi i = \Gamma i - \Phi.$  (2)

When a characteristic image to be obtained is represented by Ui, the characteristic image Ui is an eigenvector of a covariance matrix C represented by the following formula (3).

$$C = (1/M)\Sigma\Phi_i\Phi_i^T = AA^T = [\Phi_1\Phi_2 \ldots \Phi_M][\Phi_1\Phi_2 \ldots \Phi_M]^T \qquad (3)$$

Since the eigenvector is a $N^2 \times N^2$-dimensional matrix, formula (3) is solved with the dimension of formula (3) reduced on the assumption that $M < N^2$ in the following manner. That is, when the eigenvector of $A^T A$ (M×M matrix) is represented by $V_i$ (1×M matrix) and the both sides of the following formula (4) are multiplied by A, the following formula (5) is obtained. That is, $AV_i$ is the eigenvector of $AA^T$.

$$A^T A V_i = \mu_i V_i \quad (4)$$

$$AA^T A V_i = \mu_i A V_i \quad (5)$$

Accordingly, the characteristic image $U_l$ is obtained from the following formula (6).

$$Ul = \sum_{k=1}^{M} V_{lk} \Phi_k (l = 1 \sim M) \quad (6)$$

The characteristic image for side chest radiation images can be obtained in the similar manner. In this embodiment, the characteristic image for front chest radiation images is represented by $U_{fl}$ and the characteristic image for side chest radiations image is represented by $U_{sl}$. M' (M'≦M) characteristic images are selected in the order of their decreasing eigenvalues.

When recognizing the photographing direction of an image Γ, elements $\omega_{fl}$ for the characteristic image for front chest radiation images and elements $\omega_{sl}$ for the characteristic image for side chest radiation images are calculated.

The elements $\omega_{fl}$ for the characteristic image for front chest radiation images are calculated according to the following formulae (7) and (8).

$$\Gamma - \Psi_f = \Phi_f \quad (7)$$

wherein $\Psi_f$: Ψ calculated according to formula (1) for the front chest radiation images.

$$\omega_{fl} = U_{fl}^T \Phi_f \quad (8)$$

Projection $\Phi_f'$ of $\Phi_f$ calculated according to formula (7) onto the image space of the front chest radiation images is calculated according to the following formula (9).

$$\Phi_f' = \sum_{l=1}^{M'} \varpi_{fl} U_{fl} \quad (9)$$

The elements $\omega_{sl}$ for the characteristic image for side chest radiation images are calculated according to the following formulae (10) and (11).

$$\Gamma - \Psi_s = \Phi_s \quad (10)$$

wherein $\Psi_s$: Ψ calculated according to formula (1) for the side chest radiation images.

$$\omega_{sl} = U_{sl}^T \Phi_s \quad (11)$$

Projection $\Phi_s'$ of $\Phi_s$ calculated according to formula (10) onto the image space of the side chest radiation images is calculated according to the following formula (12).

$$\Phi_s' = \sum_{l=1}^{M'} \varpi_{sl} U_{sl} \quad (12)$$

Then square distances $|\Phi_f - \Phi_f'|$ and $|\Phi_s - \Phi_s'|$ are calculated and the direction in which the square distance is smaller is determined to be the photographing direction. When the degrees of coincidence between $\Phi_f$ and $\Phi_f'$, and between $\Phi_s$ and $\Phi_s'$ can be detected, the photographing direction may be recognized by the use of values other than the square distances such as correlation values.

When calculating the characteristic images $U_{fl}$ and $U_{sl}$, it is preferred that the size of lungs included in chest radiation images be normalized. Further, in order to perform the operation at a higher efficiency, images of N×N may be reduced to about one tenth (1/10).

When recognizing the photographing direction by the use of the characteristic images $U_{fl}$ and $U_{sl}$, it is preferred the image represented by the image data Sj the photographing direction of which is to be recognized be enlarged or reduced and then the square distances be calculated in order to conform to various sizes of lungs. Otherwise, characteristic images $U_{fl}$ and $U_{sl}$ which conform to different sizes of lungs may be prepared in advance.

Instead of calculating the characteristic images $U_{fl}$ and $U_{sl}$ for the front chest radiation images and the side chest radiation images, a characteristic image for both the front chest radiation images and the side chest radiation images may be calculated. In this case, elements is calculated for each of a plurality of images Γi used in preparation of the characteristic image, and the square distance between each element and the corresponding element of the image Γ the photographing direction of which is to be judged is calculated, and the photographing direction of the image Γi in which the square distance is the smallest is determined to be the photographing direction of the image Γ.

The photographing information providing means 4 records as the tag information of the image data Sj photographing information representing the photographing direction recognized by the recognizing means 3.

The control means 5 controls the monitor 6 to display radiation images taken in the same direction side by side. That is, the control means 5 controls the monitor 6 to display front chest radiation images side by side or side chest radiation images side by side. Instead, a temporal subtraction image, obtained by subtraction between corresponding pixels of images taken at different times, may be displayed on the monitor 6.

The operation of the image processing apparatus of the first embodiment will be described, hereinbelow. The readout means 1 reads out a plurality of pieces of image data Sj from the data base 10. (step S1) Then j is initialized to 1. (step S2) The judging means 2 judges whether the given piece of image data Sj is provided with photographing information. (step S3) When it is determined in step S3 that the given piece of image data Sj is not provided with photographing information, the recognizing means 3 recognizes the photographing direction of the image represented by the image data Sj by the use of characteristic images Uf1 and Us1 which have been calculated in advance. (step S4) Then the photographing information providing means 4 attaches the recognized photographing direction to the image data Sj as the photographing information. (step S5) Then it is determined whether determination on whether the image data is provided with photographing information has been done for all the pieces of image data. (step S6) When it is determined in step S6 that the determination has not been done for all the pieces of image data, steps S3 to S6 are repeated until it is determined in step S6 that the determination has been done for all the pieces of image data with j incremented by 1 (step S7) each time. When it is determined in step S3 that the given piece of image data Sj is provided with photographing information, step S6 is executed immediately after step S3.

When it is determined in step S6 that the determination has been done for all the pieces of image data, the control means 5 controls the monitor 6 to display radiation images taken in the same direction side by side. (step S8)

Display may be switched from a front chest radiation image to a side chest radiation image or from the latter to the former in response to operation of an input means not shown.

In accordance with the first embodiment, when the piece of image data Sj is not attached with photographing information, the photographing direction is automatically recognized on the basis of the image data Sj and the recognized photographing information is attached to the image data Sj. Accordingly, even if one or more pieces of image data are not provided with photographing information, radiation images taken in the same direction can be displayed on the monitor 6 side by side, whereby the photographing direction need not be manually recognized and radiation images can be displayed at a higher efficiency.

Further since the image processing apparatus of the first embodiment can handle image data generated by an apparatus without function of providing photographing information, the range of image data which can be stored in the image data base 10 can be widened.

Figure 4:
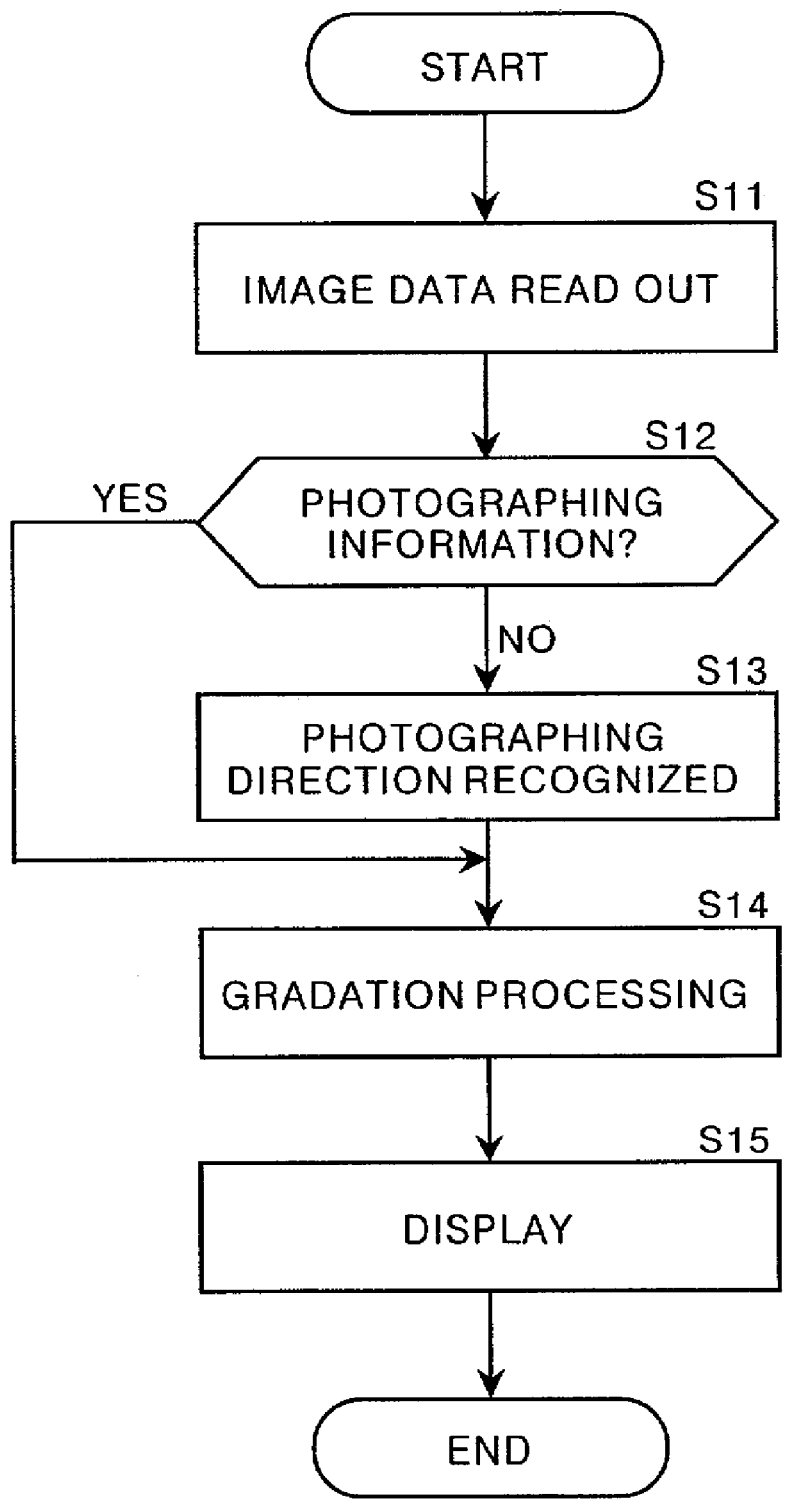
FIG. 4 is a flow chart for illustrating the operation of the image processing apparatus of the second embodiment.

An image processing apparatus in accordance with a second embodiment of the present invention will be described, hereinbelow. In the second embodiment, the elements analogous to those in the first embodiment are given the same reference numerals and will not be described here. The image processing apparatus of the second embodiment differs from that of the first embodiment in that a gradation processing means 7 which carries out gradation processing with parameters selected according to the photographing direction on image data S10 read out from the image data base 10 and obtains processed image data S11 is provided in place of the photographing information providing means 4 and the control means 5. The operation of the image processing apparatus of the second embodiment will be described, hereinbelow, with reference to FIG. 4. The read-out means 1 reads out image data S10 from the data base 10. (step S11) Then the judging means 2 judges whether the image data S10 is provided with photographing information. (step S12) When it is determined in step S12 that the image data S10 is not provided with photographing information, the recognizing means 3 recognizes the photographing direction of the image represented by the image data S10 by the use of characteristic images Uf1 and Us1 which have been calculated in advance. (step S13) Then the gradation processing means 7 carries out gradation processing with parameters selected according to the photographing direction recognized by the recognizing means 3 on the image data S10 read out from the image data base 10 and obtains processed image data S11. (step S14) When it is determined in step S12 that the image data S10 is provided with photographing information, step S14 is executed immediately after step S12. After step S14, the monitor 6 displays a radiation image on the basis of the processed image data S11. (step S15)

As can be understood from the description above, in accordance with the first embodiment, when the data S10 is not attached with photographing information, the photographing direction is automatically recognized by the recognizing means 3 and the image data S10 is subjected to gradation processing with parameters selected according to the photographing direction recognized by the recognizing means 3. Accordingly, even if the image data S10 is not provided with photographing information, image processing optimal to the photographing direction can be carried out on the image data S10.

Though, in the second embodiment, gradation processing is carried out according to the photographing direction, frequency processing, dynamic range compression processing or the like may be carried out according to the photographing direction. Further, the photographing direction recognized may be simply attached to the image data without executing any image processing according to the photographing direction recognized and the image data attached with the photographing direction recognized may be simply transferred to the data base 10 to be stored there.

Further, though, in the first and second embodiments, the photographing direction is recognized as the photographing information, the object part may be recognized in place of or in addition to the photographing direction. That is, it sometimes required to display side by side a plurality of images whose object parts are the same. At the same time, it is preferred that gradation processing parameters be selected according to the object part, e.g., liver, chest, stomach or the like. Accordingly, it is possible to recognize the object part of the image, represented by image data without photographing information, by the use of the characteristic image and to display side by side a plurality of images whose object parts are the same according to the result of recognition or to process the image data with gradation processing parameters optimal to the object part recognized.

Further, both the photographing direction and the object part maybe recognized. In this case, a plurality of radiation images which are the same in photographing direction and object part are displayed side by side, or gradation processing or the like is carried out on the image data with gradation processing parameters optimal to the object part and the photographing direction recognized.

Further, though a plurality of images are displayed on the monitor 6 on the basis of the photographing direction recognized in the first embodiment and gradation processing is carried out on the image data on the basis of the photographing direction recognized in the second embodiment, radiation images to be subjected to metering processing for measuring the degree of scoliosis or the cardiothoracic ratio or to computer aided diagnosis of medical images in which prospective abnormal shadows are automatically detected by the use of computer processing may be selected on the basis of the object part and/or the photographing direction.

Figure 5:
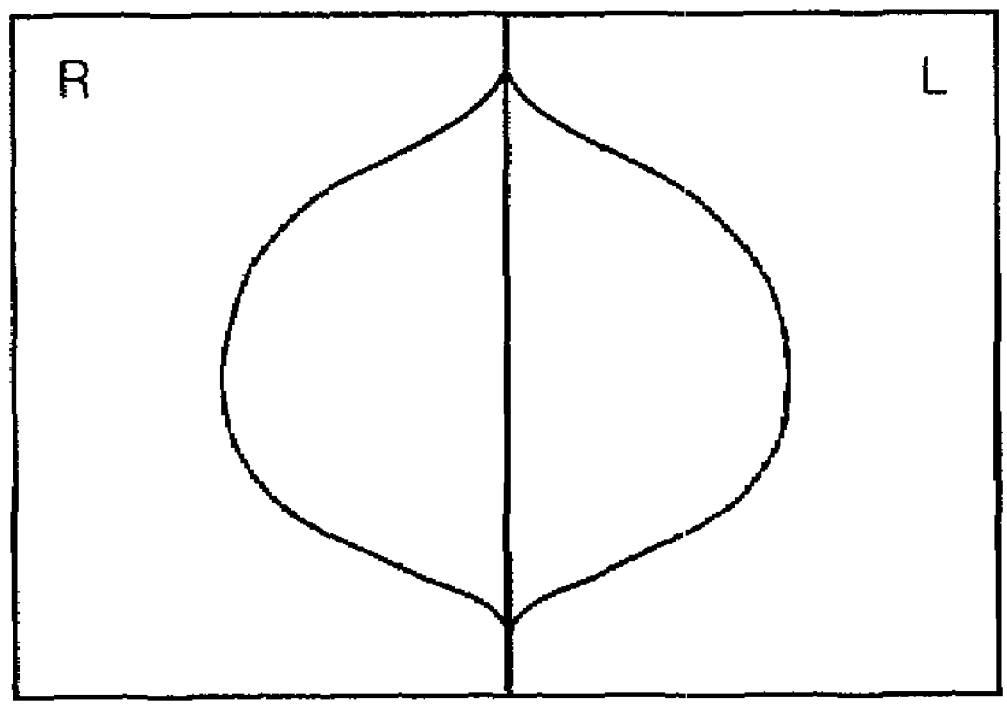
FIG. 5 is a view showing a layout of radiation images of left and right breasts.
Figure 6:
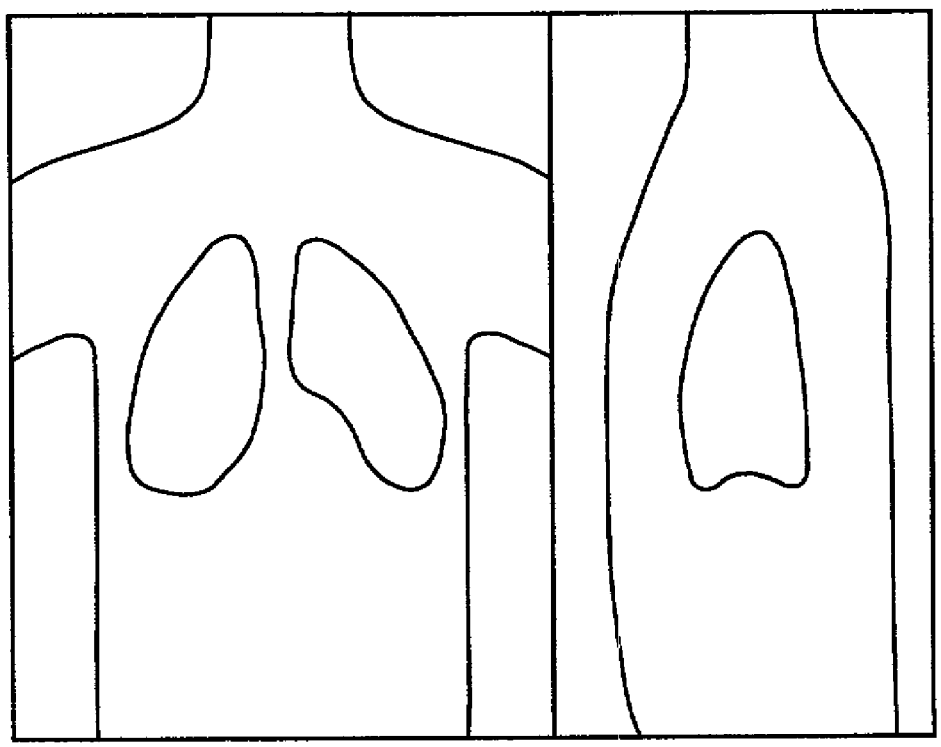
FIG. 6 is a view showing a layout of radiation images of chest taken from the front and from a side.
Figure 7:
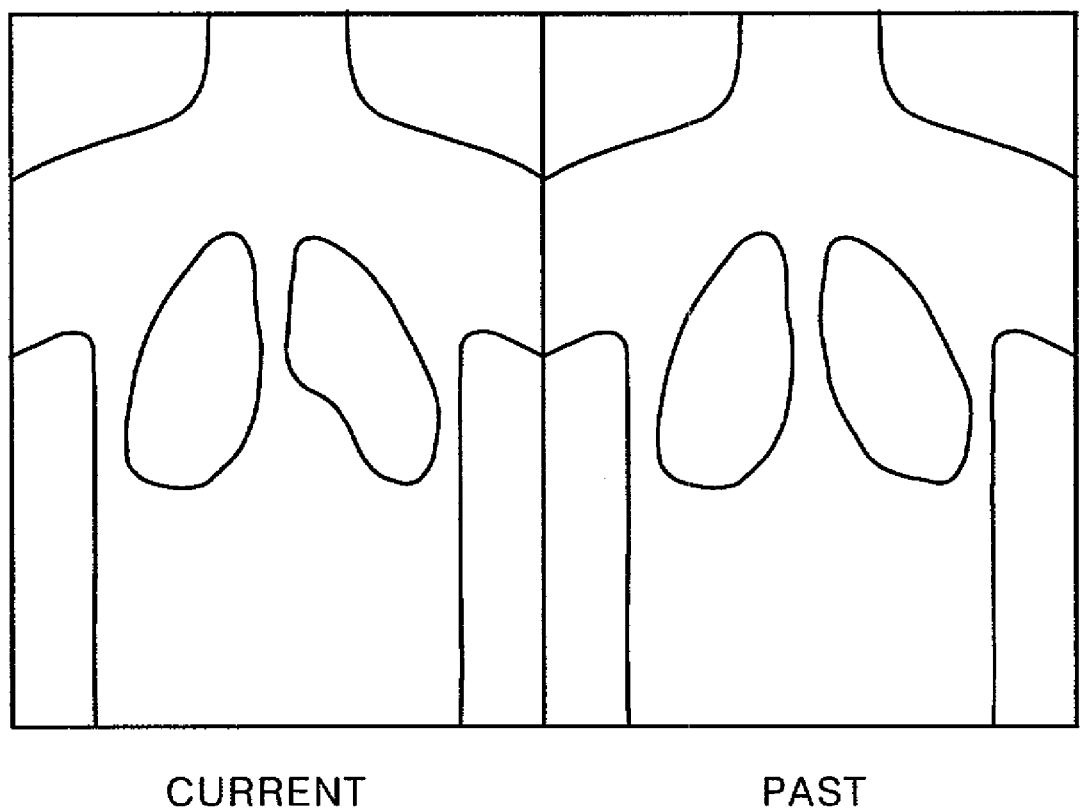
FIG. 7 is a view showing a layout of a current radiation image and a past radiation image of the same patient.

Further, layout of image display may be set according to the object part and/or the photographing direction. For example, it is possible to recognize which of left and right breast is the object part of the image data and to display the images of the left breast and the right breast side by side as shown in FIG. 5. Further, a front chest radiation image and a side chest radiation image may be displayed side by side as shown in FIG. 6. Further, a current front chest radiation image of a patient and a past front chest radiation image of the same patient may be displayed side by side as shown in FIG. 7.

A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention.

Additionally, computer code/instructions include, but are not limited to, source, object and executable code and can be in any language including higher level languages, assembly language and machine language.

What is claimed is:

1. An image processing method comprising:
   judging whether medical image data is provided with photographing information representing an object part;
   recognizing the object part on the basis of the medical image data when it is judged that the image data is not provided with photographing information, and
   subjecting the medical image data to image processing on the basis of the result of the recognition,
   wherein said image processing comprises one of:
      selecting a plurality of medical images to be compared with each other on the basis of the result of the recognition, and displaying the medical images,
      selecting a plurality of medical images which are subjected to an inter-image operation on the basis of the result of the recognition, and
      selecting a plurality of medical images which are subjected to metering processing or to a computer-aided diagnosis of medical images on the basis of the result of the recognition.

2. An image processing apparatus comprising:
   a judging means which judges whether medical image data is provided with photographing information representing an object part;
   a recognizing means which recognizes the object part on the basis of the medical image data when the judging means judges that the image data is not provided with photographing information, and
   a control means which subjects the medical image data to image processing on the basis of the result of the recognition,
   wherein said image processing executed by the control means comprises one of:
      selecting a plurality of medical images to be compared with each other on the basis of the result of the recognition, and displaying the medical images,
      selecting a plurality of medical images which are subjected to an inter-image operation on the basis of the result of the recognition, and
      selecting a plurality of medical images which are subjected to metering processing or to a computer-aided diagnosis of medical images on the basis of the result of the recognition.

3. A computer readable medium on which is recorded a computer program for causing a computer to execute the following operations:
   judging whether medical image data is provided with photographing information representing the object part;
   recognizing the object part on the basis of the medical image data when it is judged that the image data is not provided with photographing information; and
   subjecting the medical image data to image processing on the basis of the result of the recognition,
   wherein said image processing comprises one of:
      selecting a plurality of medical images to be compared with each other on the basis of the result of the recognition, and displaying the medical images,
      selecting a plurality of medical images which are subjected to an inter-image operation on the basis of the result of the recognition, and
      selecting a plurality of medical images which are subjected to metering processing or to a computer-aided diagnosis of medical images on the basis of the result of the recognition.

* * * * *